(12) United States Patent
Kurakane

(10) Patent No.: US 10,978,767 B2
(45) Date of Patent: Apr. 13, 2021

(54) METHOD FOR PRODUCING NONAQUEOUS ELECTROLYTE SECONDARY BATTERY SEPARATOR

(71) Applicant: Sumitomo Chemical Company, Limited, Tokyo (JP)

(72) Inventor: Kosuke Kurakane, Osaka (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 57 days.

(21) Appl. No.: 16/597,961

(22) Filed: Oct. 10, 2019

(65) Prior Publication Data

US 2020/0044219 A1    Feb. 6, 2020

Related U.S. Application Data

(63) Continuation of application No. 15/910,680, filed on Mar. 2, 2018, now abandoned.

(30) Foreign Application Priority Data

Mar. 3, 2017 (JP) .............................. JP2017-041087

(51) Int. Cl.

| | |
|---|---|
| H01M 2/16 | (2006.01) |
| H01M 4/13 | (2010.01) |
| H01M 10/0525 | (2010.01) |
| H01M 50/44 | (2021.01) |
| H01M 50/411 | (2021.01) |
| H01M 50/449 | (2021.01) |
| H01M 4/02 | (2006.01) |

(52) U.S. Cl.
CPC .............. *H01M 50/44* (2021.01); *H01M 4/13* (2013.01); *H01M 10/0525* (2013.01); *H01M 50/411* (2021.01); *H01M 50/449* (2021.01); *H01M 2004/027* (2013.01); *H01M 2004/028* (2013.01)

(58) Field of Classification Search
CPC .. H01M 50/44; H01M 50/411; H01M 50/449; H01M 10/0525; H01M 4/13; H01M 2004/028; H01M 2004/027; H01M 10/052; H01M 2220/30; H01M 2220/20; H01M 2300/0025; H01M 50/46; Y02E 60/10

See application file for complete search history.

(56) References Cited

U.S. PATENT DOCUMENTS

| | | | | |
|---|---|---|---|---|
| 2006/0228540 | A1* | 10/2006 | Lee | ............................. C08J 5/18 428/317.9 |
| 2007/0048607 | A1 | 3/2007 | Nakashima et al. | |
| 2010/0124708 | A1 | 5/2010 | Matsui et al. | |
| 2011/0212358 | A1 | 9/2011 | Usami et al. | |
| 2011/0262796 | A1 | 10/2011 | Shimooka et al. | |
| 2012/0295164 | A1 | 11/2012 | Nakano et al. | |
| 2013/0034769 | A1 | 2/2013 | Takagi et al. | |
| 2017/0033348 | A1 | 2/2017 | Murakami et al. | |
| 2017/0162849 | A1 | 6/2017 | Murakami et al. | |
| 2017/0229698 | A1 | 8/2017 | Mizuno | |
| 2017/0263907 | A1* | 9/2017 | Ameyama | ........... H01M 50/446 |
| 2017/0282513 | A1 | 10/2017 | Sugata et al. | |
| 2017/0301903 | A1 | 10/2017 | Choi et al. | |

FOREIGN PATENT DOCUMENTS

| | | |
|---|---|---|
| CN | 102781667 A | 11/2012 |
| EP | 2388846 A1 | 11/2011 |
| JP | 2004039492 A | 2/2004 |
| JP | 2011113921 A | 6/2011 |
| JP | 201287223 A | 5/2012 |
| JP | 4972253 B2 | 7/2012 |
| JP | 2012216426 A | 11/2012 |
| KR | 20100055338 A | 5/2010 |
| KR | 20110118075 A | 10/2011 |
| KR | 20160088434 A | 7/2016 |
| KR | 20160094846 A | 8/2016 |
| KR | 20170117732 A | 10/2017 |
| WO | 2011077564 A1 | 6/2011 |
| WO | 2016158927 A1 | 10/2016 |

OTHER PUBLICATIONS

Office Action dated Apr. 8, 2020 in CN Application No. 201810175450.2.
Office Action dated Mar. 22, 2018 in KR Application No. 2018-0025177.
Office Action dated Jul. 16, 2018 in KR Application No. 2018-0025177.
Office Action dated Mar. 1, 2019 in CN Application No. 201810175450.2.
Office Action dated Jan. 2, 2019 in U.S. Appl. No. 15/910,680 by Kurakane.
Office Action dated Jul. 10, 2019 in U.S. Appl. No. 15/910,680 by Kurakane.
Office Action dated Jan. 2, 2019 in U.S. Appl. No. 15/593,413, by Kurakane.
Office Action dated Jul. 9, 2019 in U.S. Appl. No. 15/593,413, by Kurakane.
Office Action dated Sep. 10, 2019 in CN Application No. 201810175450.2.
Office Action dated Nov. 27, 2018 in JP Application No. 2018039041 (Partial English Translation).
Office Action dated Jul. 27, 2020 in CN Application No. 201810175450.2.

\* cited by examiner

*Primary Examiner* — Muhammad S Siddiquee
(74) *Attorney, Agent, or Firm* — Panitch Schwarze Belisario & Nadel LLP

(57) ABSTRACT

An embodiment of the present invention provides, as a nonaqueous electrolyte secondary battery separator excellent in cycle characteristic, a nonaqueous electrolyte secondary battery separator including a polyolefin porous film, wherein a ratio of a displacement amount of the nonaqueous electrolyte secondary battery separator at a 10th loading-unloading cycle to a displacement amount of the nonaqueous electrolyte secondary battery separator at a 50th loading-unloading cycle is in a range of 100% to 130%.

10 Claims, 1 Drawing Sheet

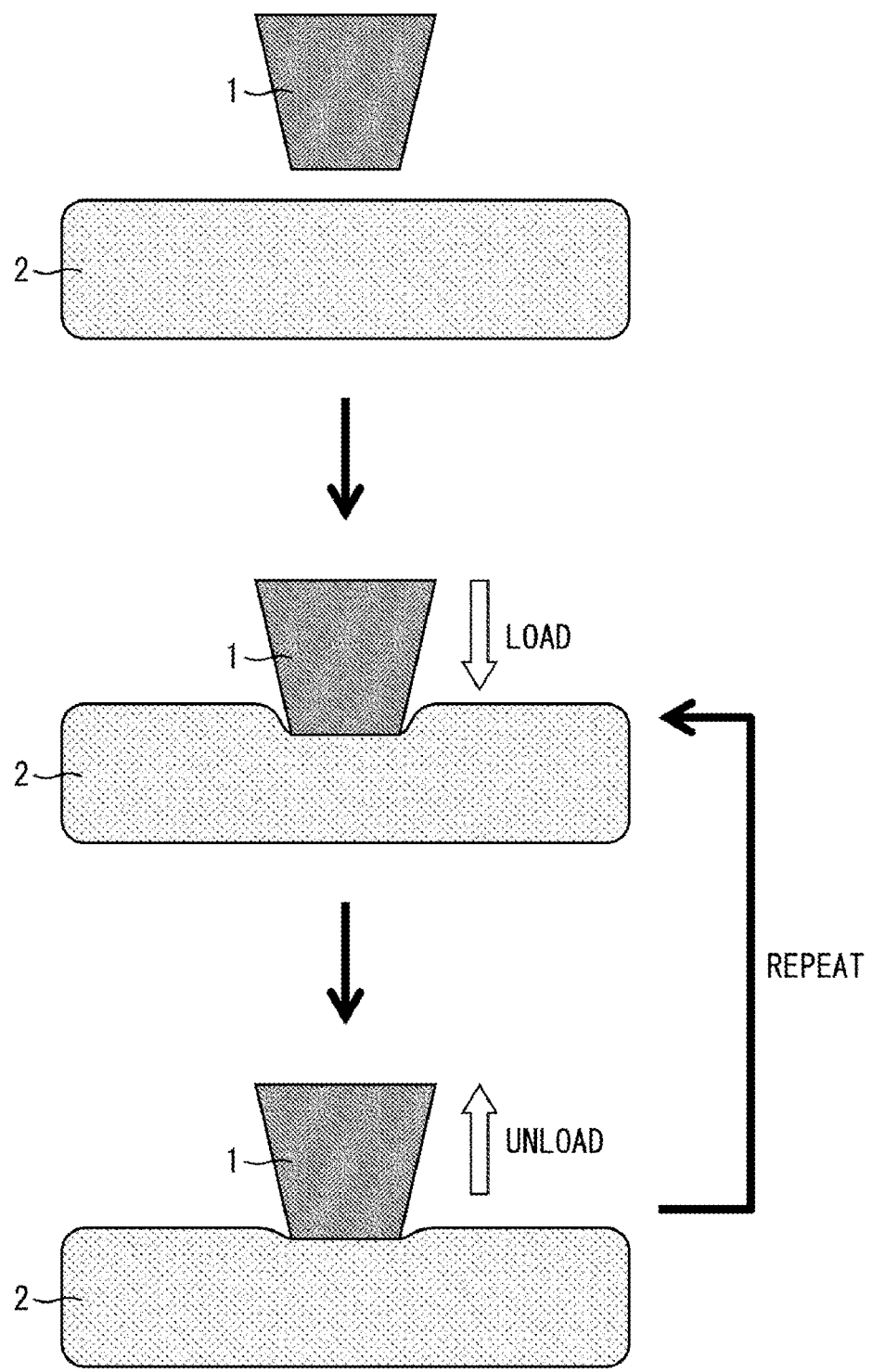

METHOD FOR PRODUCING NONAQUEOUS ELECTROLYTE SECONDARY BATTERY SEPARATOR

CROSS-REFERENCE TO RELATED APPLICATIONS

This application is a Continuation of co-pending U.S. patent application Ser. No. 15/910,680, filed Mar. 2, 2018, which claims priority under 35 U.S.C. § 119(b) to Japanese Patent Application No. 2017-041087, filed Mar. 3, 2017, the disclosures of which are incorporated herein by reference in their entirety.

TECHNICAL FIELD

The present invention relates to (i) a separator for a nonaqueous electrolyte secondary battery (hereinafter referred to as a "nonaqueous electrolyte secondary battery separator"), (ii) a laminated separator for a nonaqueous electrolyte secondary battery (hereinafter referred to as a "nonaqueous electrolyte secondary battery laminated separator"), (iii) a member for a nonaqueous electrolyte secondary battery (hereinafter referred to as a "nonaqueous electrolyte secondary battery member"), and (iv) a nonaqueous electrolyte secondary battery.

BACKGROUND ART

Nonaqueous electrolyte secondary batteries such as a lithium secondary battery are currently in wide use as (i) batteries for devices such as a personal computer, a mobile telephone, and a portable information terminal or (ii) on-vehicle batteries.

As a separator for use in such a nonaqueous electrolyte secondary battery, a porous film containing polyolefin as a main component is mainly used.

For example, Patent Literature 1 discloses that it is possible to use, as a separator for a battery that is excellent in output characteristics and durability, a microporous film having (i) specific compression characteristics such as a specific amount of compression deformation and a specific amount of increase in compression deformation and (ii) a specific pore ratio (porosity).

CITATION LIST

Patent Literature

[Patent Literature 1] Japanese Patent Application Publication, Tokukai, No. 2012-87223 (Publication Date: May 10, 2012)

SUMMARY OF INVENTION

Technical Problem

The term "amount of compression deformation" in Patent Literature 1 means a deformation amount of a microporous film at the time when a load is first applied to the microporous film in a case where the microporous film is to be repeatedly subjected to a loading-unloading cycle. The term "amount of increase in compression deformation" in Patent Literature 1 means a value based on a difference between (i) an amount of deformation of a microporous film at the time when a load is first applied to the microporous film and (ii) an amount of deformation of the microporous film at the time when a load is applied to the microporous film for the 10th time. This case where a load is applied ten times corresponds to the case of a short-term charge-discharge cycle.

However, Patent Literature 1 discloses nothing about a rate of increase in "amount of compression deformation" in a case where a loading-unloading cycle is repeated more than ten times, which case corresponds to the case of a long-term charge-discharge cycle. Meanwhile, a conventional battery separator as disclosed in Patent Literature 1 was not sufficient in battery output characteristic in a case where a long-term charge-discharge cycle was repeated. In other words, a conventional battery separator was not sufficient in cycle characteristic.

Solution to Problem

In view of the above, the inventor of the present invention focused on a ratio between a displacement amount of a separator at the 10th loading-unloading cycle and a displacement amount of the separator at the 50th loading-unloading cycle, which ratio corresponds to a degree of deformation of the separator in a case where a long-term charge-discharge cycle is carried out. Then, the inventor of the present invention has found that in a case where the ratio between the above displacement amounts of a nonaqueous electrolyte secondary battery separator including a polyolefin porous film is in a specific range, the nonaqueous electrolyte secondary battery separator has an excellent cycle characteristic. Consequently, the inventor of the present invention has arrived at the present invention.

The present invention encompasses aspects described in the following [1] to [4].

[1] A nonaqueous electrolyte secondary battery separator including a polyolefin porous film, wherein:
a ratio of a displacement amount of the nonaqueous electrolyte secondary battery separator at a 10th loading-unloading cycle to a displacement amount of the nonaqueous electrolyte secondary battery separator at a 50th loading-unloading cycle is in a range of 100% to 130%.

[2] A nonaqueous electrolyte secondary battery laminated separator including: a nonaqueous electrolyte secondary battery separator as described in [1] and an insulating porous layer.

[3] A nonaqueous electrolyte secondary battery member including: a positive electrode; a nonaqueous electrolyte secondary battery separator as described in [1] or a nonaqueous electrolyte secondary battery laminated separator as described in [2]; and a negative electrode, the positive electrode, the nonaqueous electrolyte secondary battery separator or the nonaqueous electrolyte secondary battery laminated separator, and the negative electrode being disposed in this order.

[4] A nonaqueous electrolyte secondary battery including: a nonaqueous electrolyte secondary battery separator as described in [1] or a nonaqueous electrolyte secondary battery laminated separator as described in [2].

Advantageous Effects of Invention

A nonaqueous electrolyte secondary battery separator in accordance with an embodiment of the present invention advantageously achieves a high capacity maintenance ratio in a case where a nonaqueous electrolyte secondary battery including the nonaqueous electrolyte secondary battery separator is repeatedly subjected to a charge-discharge cycle. Accordingly, the nonaqueous electrolyte secondary battery separator in accordance with an embodiment of the present invention advantageously achieves an excellent cycle characteristic.

BRIEF DESCRIPTION OF DRAWINGS

FIG. 1 is a schematic view illustrating a loading-unloading cycle in an embodiment of the present invention.

DESCRIPTION OF EMBODIMENTS

The following description will discuss an embodiment of the present invention. The present invention is, however, not limited to the embodiment below. The present invention is not limited to the arrangements described below, but may be altered in various ways by a skilled person within the scope of the claims. Any embodiment based on a proper combination of technical means disclosed in different embodiments is also encompassed in the technical scope of the present invention. Note that numerical expressions such as "A to B" herein mean "not less than A and not more than B" unless otherwise stated.

Embodiment 1: Nonaqueous Electrolyte Secondary Battery Separator

A nonaqueous electrolyte secondary battery separator in accordance with Embodiment 1 of the present invention is a nonaqueous electrolyte secondary battery separator including a polyolefin porous film, wherein: a ratio of a displacement amount of the nonaqueous electrolyte secondary battery separator at a 10th loading-unloading cycle to a displacement amount of the nonaqueous electrolyte secondary battery separator at a 50th loading-unloading cycle is in a range of 100% to 130%.

The nonaqueous electrolyte secondary battery separator in accordance with Embodiment 1 of the present invention includes a polyolefin porous film, and is preferably constituted by a polyolefin porous film. Note, here, that the "polyolefin porous film" is a porous film which contains a polyolefin-based resin as a main component. Note that the phrase "contains a polyolefin-based resin as a main component" means that a porous film contains a polyolefin-based resin at a proportion of not less than 50% by volume, preferably not less than 90% by volume, and more preferably not less than 95% by volume, relative to the whole of materials of which the porous film is made.

The polyolefin porous film can be the nonaqueous electrolyte secondary battery separator in accordance with an embodiment of the present invention or a base material of a nonaqueous electrolyte secondary battery laminated separator in accordance with an embodiment of the present invention, which will be described later. The polyolefin porous film has therein many pores, connected to one another, so that a gas and/or a liquid can pass through the polyolefin porous film from one side to the other side.

The polyolefin-based resin more preferably contains a high molecular weight component having a weight-average molecular weight of $3\times10^5$ to $15\times10^6$. In particular, the polyolefin-based resin more preferably contains a high molecular weight component having a weight-average molecular weight of not less than 1,000,000 because the polyolefin porous film containing such a polyolefin-based resin and a nonaqueous electrolyte secondary battery laminated separator including such a polyolefin porous film each have a higher strength.

Examples of the polyolefin-based resin which the polyolefin porous film contains as a main component include, but are not particularly limited to, homopolymers (for example, polyethylene, polypropylene, and polybutene) and copolymers (for example, ethylene-propylene copolymer) both of which are thermoplastic resins and are each produced through polymerization of a monomer(s) such as ethylene, propylene, 1-butene, 4-methyl-1-pentene, and/or 1-hexene. The polyolefin porous film can include a layer containing only one of these polyolefin-based resins or a layer containing two or more of these polyolefin-based resins. Among these, polyethylene is preferable as it is capable of preventing (shutting down) a flow of an excessively large electric current at a lower temperature. A high molecular weight polyethylene containing ethylene as a main component is particularly preferable. Note that the polyolefin porous film can contain a component(s) other than polyolefin as long as such a component does not impair the function of the layer.

Examples of the polyethylene include low-density polyethylene, high-density polyethylene, linear polyethylene (ethylene-α-olefin copolymer), and ultra-high molecular weight polyethylene having a weight-average molecular weight of not less than 1,000,000. Among these examples, ultra-high molecular weight polyethylene having a weight-average molecular weight of not less than 1,000,000 is preferable. It is more preferable that the polyethylene contain a high molecular weight component having a weight-average molecular weight of $5\times10^5$ to $15\times10^6$.

A ratio (hereinafter, also simply referred to simply as "displacement ratio") of a displacement amount of the nonaqueous electrolyte secondary battery separator in accordance with an embodiment of the present invention at the 10th loading-unloading cycle to a displacement amount of the nonaqueous electrolyte secondary battery separator at the 50th loading-unloading cycle is in a range of 100% to 130%.

The "displacement amount" at a loading-unloading cycle and the "displacement ratio" of the nonaqueous electrolyte secondary battery separator in accordance with an embodiment of the present invention can be measured by a method described below.

As illustrated in FIG. 1, a 1 cm square piece is cut out from the nonaqueous electrolyte secondary battery separator, so that a measurement sample 2 is obtained. The measurement sample 2 is fixed onto a sample stage with an adhesive (water-based glue). Then, a flat indenter 1 (made of diamond) having a diameter of 50 μm is pushed into the measurement sample 2 at a speed of 0.4877 mN/sec from a surface of the measurement sample 2 until the flat indenter 1 reaches a depth at which an applied load reaches 1 mN (loading). Immediately after this loading and without a hold time, the flat indenter 1 is retracted at a speed of 0.4877 mN/sec to the position of the surface of the measurement sample 2, at which position the applied load is 0 mN (unloading). The term "applied load" here means the magnitude of stress that is applied to the flat indenter 1 by the measurement sample 2 in a case where the flat indenter 1 is pushed into the measurement sample 2.

A cycle in which a load is applied to the measurement sample 2 and then immediately removed from the measurement sample 2 (herein, referred to as "loading-unloading cycle") is repeated 50 times. At the 10th loading-unloading cycle, the measurement sample 2 is subjected to measurement of a distance between (i) a depth at which the flat indenter 1 pushed into the measurement sample 2 has reached in the measurement sample 2 and (ii) a position of the surface of the measurement sample 2 at which position an applied load to the flat indenter 1 retracted is 0 mN. This distance is defined as a displacement amount (unit: μm) at the 10th loading-unloading cycle. Similarly, at the 50th loading-unloading cycle, the measurement sample 2 is subjected to measurement of a distance between (i) a depth at which the flat indenter 1 pushed into the measurement sample 2 has reached in the measurement sample 2 and (ii) a position of the surface of the measurement sample 2 at which position an applied load to the flat indenter 1 retracted is 0 mN. This distance is defined as a displacement amount (unit: μm) at the 50th loading-unloading cycle.

The term "surface" here means a position at which the applied load was 0 mN at the end of unloading in an immediately preceding loading-unloading cycle.

The displacement ratio is calculated from the displacement amount at the 10th loading-unloading cycle and the displacement amount at the 50th loading-unloading cycle, which are measured by the method described above.

In the nonaqueous electrolyte secondary battery, volumes of active materials (positive electrode active material and negative electrode active material) of electrodes change when the nonaqueous electrolyte secondary battery is charged/discharged. Accordingly, the electrodes (positive electrode and negative electrode) expand and shrink in accordance with charging and discharging. Therefore, when a charge-discharge cycle is repeated, stress is repeatedly applied to the nonaqueous electrolyte secondary battery separator due to expansion of the electrodes (loading). Further, since the electrodes shrink, the nonaqueous electrolyte secondary battery separator repeatedly undergoes the loading and unloading.

When the nonaqueous electrolyte secondary battery separator is repeatedly subjected to the loading-unloading cycle a plurality of times, the nonaqueous electrolyte secondary battery separator plastically deforms due an applied load repeatedly to the nonaqueous electrolyte secondary battery separator. Accordingly, when the loading-unloading cycle is repeated, a distance by which the flat indenter 1 is retracted particularly in unloading gradually decreases. This leads to a decrease in displacement amount in the loading-unloading cycle.

Therefore, in the nonaqueous electrolyte secondary battery separator in accordance with an embodiment of the present invention, the lower limit of the displacement ratio is 100%.

In the nonaqueous electrolyte secondary battery separator in accordance with an embodiment of the present invention, the displacement ratio being not more than 130% means that a degree of plastic deformation of the nonaqueous electrolyte secondary battery separator is small in a case where a long-term charge-discharge cycle is repeated. In a case where the degree of plastic deformation is large, a gap is formed between the nonaqueous electrolyte secondary battery separator and an electrode. This is because a large degree of plastic deformation increases a difference between (i) a degree of deformation of the nonaqueous electrolyte secondary battery separator and (ii) a degree of the expansion and shrinkage of the electrodes, in a case where the long-term charge-discharge cycle is repeated. In this case, a product, gas, etc. derived from decomposition of an electrolyte etc. accumulates in the gap between the nonaqueous electrolyte secondary battery separator and the electrode. This may result in deterioration in battery characteristic such as a cycle characteristic. If the displacement ratio is not more than 130%, formation of such a gap and deterioration in battery characteristic can be reduced. In view of the above, the displacement ratio is preferably not more than 125%, and more preferably not more than 120%.

In contrast, a low value of the displacement ratio means that the displacement amount of the nonaqueous electrolyte secondary battery separator hardly changes even in a case where the charge-discharge cycle is repeated.

As described above, in the nonaqueous electrolyte secondary battery, a product, gas, etc. derived from decomposition of the electrolyte etc. are formed. Further, the product, gas, etc. irreversibly increase. In a case where the displacement ratio is too low, the separator hardly deforms plastically, so that stress resulting from formation of the product, gas, etc. is permanently applied to the electrodes and the nonaqueous electrolyte secondary battery separator. This may result in a change in electrode structure etc., and may consequently lead to deterioration in battery characteristic such as a cycle characteristic. In view of the above, the displacement ratio is preferably not less than 103% and more preferably not less than 106%.

The thickness of the polyolefin porous film is not particularly limited, but is preferably 4 μm to 40 μm, and more preferably 5 μm to 20 μm.

The thickness of the polyolefin porous film is preferably not less than 4 μm since an internal short circuit can be sufficiently prevented with such a thickness.

On the other hand, the thickness of the polyolefin porous film is preferably not more than 40 μm since an increase in size of a nonaqueous electrolyte secondary battery can be prevented with such a thickness.

The polyolefin porous film typically has a weight per unit area of preferably 4 $g/m^2$ to 20 $g/m^2$, and more preferably 5 $g/m^2$ to 12 $g/m^2$, so as to allow a nonaqueous electrolyte secondary battery to have a higher weight energy density and a higher volume energy density.

The polyolefin porous film has an air permeability of preferably 30 sec/100 mL to 500 sec/100 mL, and more preferably 50 sec/100 mL to 300 sec/100 mL, in terms of Gurley values, since a sufficient ion permeability is exhibited with such an air permeability.

The polyolefin porous film has a porosity of preferably 20% by volume to 80% by volume, and more preferably 30% by volume to 75% by volume, so as to (i) retain a larger amount of electrolyte and (ii) obtain the function of reliably preventing (shutting down) a flow of an excessively large electric current at a lower temperature.

The polyolefin porous film has a pore diameter of preferably not more than 0.3 μm and more preferably not more than 0.14 μm, in view of sufficient ion permeability and of preventing particles which constitute an electrode from entering the polyolefin porous film.

The nonaqueous electrolyte secondary battery separator in accordance with an embodiment of the present invention may include an insulating porous layer (hereinafter, also referred to as simply "porous layer") as needed, in addition to the polyolefin porous film. Examples of the porous layer encompass a porous layer constituting the nonaqueous electrolyte laminated separator (described later) and, as other porous layers, publicly known porous layers such as a heat-resistant layer, an adhesive layer, and a protective layer.

[Method for Producing Polyolefin Porous Film]

Examples of a method for producing the polyolefin porous film include, but are not particularly limited to, a method in which a polyolefin-based resin and an additive are melt-kneaded and then extruded to obtain a polyolefin resin composition, and the polyolefin resin composition thus obtained is subjected to stretching, cleaning, drying and/or heat fixing.

Specifically, the method can be a method including the following steps of:

(A) melt-kneading a polyolefin-based resin powder and an additive (pore forming agent) in a kneader to obtain a polyolefin resin composition;
(B) extruding, through a T-die of an extruder, the polyolefin resin composition having been obtained in the step (A), and then shaping the polyolefin resin composition into a sheet while cooling the polyolefin resin composition, so that a sheet-shaped polyolefin resin composition is obtained;
(C) stretching the sheet-shaped polyolefin resin composition having been obtained in the step (B);
(D) cleaning, with use of a cleaning liquid, the polyolefin resin composition having been stretched in the step (C); and
(E) drying and/or heat fixing the polyolefin resin composition having been cleaned in the step (D), so that a polyolefin porous film is obtained.

In the step (A), the polyolefin-based resin is used in an amount of preferably 6% by weight to 45% by weight, and more preferably 9% by weight to 36% by weight, with respect to 100% by weight of the polyolefin resin composition to be obtained.

Examples of the additive in the step (A) include: phthalate esters such as dioctyl phthalate; unsaturated higher alcohol such as oleyl alcohol; saturated higher alcohol such as stearyl alcohol; low molecular weight polyolefin-based resin such as paraffin wax; petroleum resin; and liquid paraffin.

Examples of the petroleum resin include: (i) an aliphatic hydrocarbon resin obtained through polymerization of a C5 petroleum fraction such as isoprene, pentene, and pentadiene as a main material; (ii) an aromatic hydrocarbon resin obtained through polymerization of a C9 petroleum fraction such as indene, vinyltoluene, and methyl styrene as a main material; (iii) copolymer resins of the aliphatic hydrocarbon resin and the aromatic hydrocarbon resin; (iv) alicyclic saturated hydrocarbon resins obtained through hydrogenation of the resins (i) to (iii); and (v) varying mixtures of the resins (i) to (iv). Among the above hydrocarbon resins, the alicyclic saturated hydrocarbon resin is preferable.

In the step (A), it is preferable to use, as the additive, a combination of an additive (i) that exists in a solid state at normal temperature (25° C.) and an additive (ii) that exists in a liquid state at normal temperature.

The additive (i) is preferably a petroleum resin. Among petroleum resins, the additive (i) is preferably an aliphatic hydrocarbon resin having a softening point of 90° C. to 125° C. or an alicyclic saturated hydrocarbon resin having a softening point of 90° C. to 125° C., and more preferably the alicyclic saturated hydrocarbon resin having a softening point of 90° C. to 125° C. In the step (A), the additive (i) is used in an amount of preferably 0.5% by weight to 40% by weight, and more preferably 1% by weight to 30% by weight, with respect to 100% by weight of the polyolefin resin composition to be obtained.

The additive (ii) is preferably liquid paraffin, which serves as a pore forming agent. In the step (A), the additive (ii) is used in an amount of preferably 50% by weight to 90% by weight, and more preferably 60% by weight to 85% by weight, with respect to 100% by weight of the polyolefin resin composition to be obtained.

Use of the additives (i) and (ii) in combination tends to reduce the probability of plastic deformation of the polyolefin porous film to be obtained.

In cooling in the step (B), it is possible to use, for example, a method in which the polyolefin resin composition is put in contact with a cooling medium such as cool air, cooling water, or the like, or a method in which the polyolefin resin composition is put in contact with a cooling roller. It is preferable to use the method in which the polyolefin resin composition is put in contact with a cooling roller.

In the step (C), it is possible to use a commercially-available stretching apparatus for stretching the sheet-shaped polyolefin resin composition. More specifically, the sheet-shaped polyolefin resin composition may be stretched by (i) a method in which an end of the sheet is seized by a chuck and the sheet is drawn, (ii) a method in which rollers for conveying the sheet are set at different rotation speeds so as to draw the sheet, or (iii) a method in which the sheet is rolled by using a pair of rollers.

The temperature of the sheet-shaped polyolefin resin composition in stretching is not more than a crystalline melting point of the polyolefin resin composition. The temperature is preferably not lower than 80° C. and not higher than 125° C., and more preferably not lower than 100° C. and not higher than 120° C.

The sheet may be stretched in only the MD or TD or in both of the MD and the TD. In a case where the sheet is stretched in both of the MD and the TD, the sheet may be subjected to sequential biaxial stretching in which the sheet is first stretched in the MD and then stretched in the TD or alternatively may be subjected to simultaneous biaxial stretching in which the sheet is simultaneously stretched in the MD and the TD.

Note that a "machine direction (MD) of a polyolefin porous film" as used herein means a conveyance direction in which a polyolefin porous film is conveyed during production of the polyolefin porous film. Note also that a "transverse direction (TD) of a polyolefin porous film" as used herein means a direction perpendicular to the MD of a polyolefin porous film.

In stretching in at least either the MD or the TD, preferably, the relation of a (feed speed), an (intermediate speed), and a (discharge speed) of a film in the stretching apparatus is arranged to be (feed speed)<(discharge speed)<(intermediate speed) and preferably, an operation of stretching is continuously carried out so as not to cause a slack of the film. In other words, it is preferable to arrange such that the discharge speed at which the film is sequentially discharged from the stretching apparatus be faster than the feed speed at which the film is sequentially fed into the stretching apparatus, and that the intermediate speed in the stretching apparatus be faster than both the feed speed and the discharge speed.

For example, it is possible to use a method in which the speeds in the step of stretching are adjusted such that relative to the (feed speed) x, the (intermediate speed) is arranged to be 7x and the (discharge speed) is arranged to be 4x. In this case, though a stretch ratio corresponding to the intermediate speed is 7 times, a stretch ratio corresponding to the discharge speed (ultimate stretch ratio) is 4 times.

In this case, a speed adjustment ratio (stretching speed ratio) in a latter half of the step of stretching is calculated as $(7x-4x)/7x=0.43$.

In an example case where a film is stretched in the MD, more specifically, the above speeds can be adjusted such that the speed of the film is sequentially decreased down to a set value of the discharge speed, from the speed of the film at the time when the stretching speed reaches the maximum stretching speed after the film has been fed into the stretching apparatus. In this case, the speed of the film is decreased toward an exit of the film before a stretched state of the film is fixed. The stretching speed ratio is preferably 0.1 to 0.7.

When the above stretching method is employed, the probability of plastic deformation of the polyolefin porous film to be obtained tends to be reduced.

The stretch ratio in the MD is preferably not less than 1.2 times and less than 7.0 times, and more preferably not less than 1.4 times and not more than 6.5 times. The stretch ratio in the TD is preferably not less than 3.0 times and less than 7.0 times, and more preferably not less than 4.5 times and not more than 6.5 times. Note that the stretch ratio here means the ultimate stretch ratio described above.

The cleaning liquid used in the step (D) is not limited to a particular one, provided that the cleaning liquid is a solvent capable of removing the pore forming agent and the like. Examples of the cleaning liquid used in the step (D) include heptane and dichloromethane.

In the step (E), the above cleaning solvent is removed from the polyolefin resin composition having been cleaned in the step (D) and then, the polyolefin resin composition is heat-treated at a specific temperature for heat fixing, so that the polyolefin porous film is obtained.

The heat fixing is carried out at a temperature of preferably not lower than 110° C. and not higher than 130° C., and more preferably not lower than 115° C. and not higher than 128° C. Further, the heat fixing is carried out for a period of preferably not less than 15 seconds and less than 20 minutes, and more preferably not less than 1 minute and not more than 15 minutes.

When the heat fixing is carried out under the above conditions, the probability of plastic deformation of the polyolefin porous film to be obtained tends to be reduced.

As described above, it is preferable to employ the above stretching method and a heat-fixation temperature in the above specific range in the method for producing the polyolefin porous film. In addition, the use of the additives (i) and (ii) in combination makes it possible to more suitably produce a polyolefin porous film having a suitable displacement ratio.

Embodiment 2: Nonaqueous Electrolyte Secondary Battery Laminated Separator

A nonaqueous electrolyte secondary battery laminated separator in accordance with Embodiment 2 of the present invention includes (i) a nonaqueous electrolyte secondary battery separator in accordance with Embodiment 1 of the present invention and (ii) an insulating porous layer. Accordingly, the nonaqueous electrolyte secondary battery laminated separator in accordance with Embodiment 2 of the present invention includes a polyolefin porous film constituting the above-described nonaqueous electrolyte secondary battery separator in accordance with Embodiment 1 of the present invention.

[Insulating Porous Layer]

The insulating porous layer constituting the nonaqueous electrolyte secondary battery laminated separator in accordance with an embodiment of the present invention is typically a resin layer containing a resin. This insulating porous layer is preferably a heat-resistant layer or an adhesive layer. The insulating porous layer preferably contains a resin that is insoluble in an electrolyte of a battery and that is electrochemically stable when the battery is in normal use.

The porous layer is provided on one surface or both surfaces of the nonaqueous electrolyte secondary battery separator as needed. In a case where the porous layer is provided on one surface of the polyolefin porous film, the porous layer is preferably provided on that surface of the polyolefin porous film which surface faces a positive electrode of a nonaqueous electrolyte secondary battery to be produced, more preferably on that surface of the polyolefin porous film which surface comes into contact with the positive electrode.

Examples of the resin constituting the porous layer encompass polyolefins; (meth)acrylate-based resins; fluorine-containing resins; polyamide-based resins; polyimide-based resins; polyester-based resins; rubbers; resins with a melting point or glass transition temperature of not lower than 180° C.; and water-soluble polymers.

Among the above resins, polyolefins, acrylate-based resins, fluorine-containing resins, polyamide-based resins, polyester resins and water-soluble polymers are preferable. As the polyamide resins, wholly aromatic polyamides (aramid resins) are preferable. As the polyester resins, polyarylates and liquid crystal polyesters are preferable.

The porous layer may contain fine particles. The term "fine particles" herein means organic fine particles or inorganic fine particles generally referred to as a filler. Therefore, in a case where the porous layer contains fine particles, the above resin contained in the porous layer has a function as a binder resin for binding (i) fine particles together and (ii) fine particles and the porous film. The fine particles are preferably electrically insulating fine particles.

Examples of the organic fine particles contained in the porous layer encompass resin fine particles.

Specific examples of the inorganic fine particles contained in the porous layer encompass fillers made of inorganic matters such as calcium carbonate, talc, clay, kaolin, silica, hydrotalcite, diatomaceous earth, magnesium carbonate, barium carbonate, calcium sulfate, magnesium sulfate, barium sulfate, aluminum hydroxide, boehmite, magnesium hydroxide, calcium oxide, magnesium oxide, titanium oxide, titanium nitride, alumina (aluminum oxide), aluminum nitride, mica, zeolite, and glass. These inorganic fine particles are electrically insulating fine particles. The porous layer may contain only one kind of the fine particles or two or more kinds of the fine particles in combination.

Among the above fine particles, fine particles made of an inorganic matter is suitable. Fine particles made of an inorganic oxide such as silica, calcium oxide, magnesium oxide, titanium oxide, alumina, mica, zeolite, aluminum hydroxide, or boehmite are preferable. Further, fine particles made of at least one kind selected from the group consisting of silica, magnesium oxide, titanium oxide, aluminum hydroxide, boehmite, and alumina are more preferable. Fine particles made of alumina are particularly preferable.

A fine particle content of the porous layer is preferably 1% by volume to 99% by volume, and more preferably 5% by volume to 95% by volume, with respect to 100% by volume of the porous layer. In a case where the fine particle content falls within the above range, it is less likely for a void, which is formed when fine particles come into contact with each other, to be blocked by a resin or the like. This makes it possible to achieve sufficient ion permeability and a proper weight per unit area of the porous film.

The porous layer may include a combination of two or more kinds of fine particles which differ from each other in particle or specific surface area.

A thickness of the porous layer is preferably 0.5 μm to 15 μm (per single porous layer), and more preferably 2 μm to 10 μm (per single porous layer).

If the thickness of the porous layer is less than 1 μm, it may not be possible to sufficiently prevent an internal short circuit caused by breakage or the like of a battery. In addition, an amount of electrolyte solution to be retained by the porous layer may decrease. In contrast, if a total thickness of porous layers on both surfaces of the nonaqueous electrolyte secondary battery separator is above 30 μm, then a rate characteristic or a cycle characteristic may deteriorate.

The weight per unit area of the porous layer (per single porous layer) is preferably 1 g/m$^2$ to 20 g/m$^2$, and more preferably 4 g/m$^2$ to 10 g/m$^2$.

A volume per square meter of a porous layer constituent component contained in the porous layer (per single porous layer) is preferably 0.5 cm$^3$ to 20 cm$^3$, more preferably 1 cm$^3$ to 10 cm$^3$, and still more preferably 2 cm$^3$ to 7 cm$^3$.

For the purpose of obtaining sufficient ion permeability, a porosity of the porous layer is preferably 20% by volume to 90% by volume, and more preferably 30% by volume to 80% by volume. In order for a nonaqueous electrolyte secondary battery laminated separator to obtain sufficient ion permeability, a pore diameter of each of pores of the porous layer is preferably not more than 3 μm, and more preferably not more than 1 μm.

[Laminated Body]

A laminated body which is the nonaqueous electrolyte secondary battery laminated separator in accordance with Embodiment 2 of the present invention includes a nonaqueous electrolyte secondary battery separator in accordance with an embodiment of the present invention and an insulating porous layer. The laminated body is preferably arranged such that the above-described insulating porous layer is provided on one surface or both surfaces of the nonaqueous electrolyte secondary battery separator in accordance with an embodiment of the present invention.

The laminated body in accordance with an embodiment of the present invention has a thickness of preferably 5.5 μm to 45 μm, and more preferably 6 μm to 25 μm.

The laminated body in accordance with an embodiment of the present invention has an air permeability of preferably 30 sec/100 mL to 1000 sec/100 mL, and more preferably 50 sec/100 mL to 800 sec/100 mL, in terms of Gurley values.

The laminated body in accordance with an embodiment of the present invention may include, in addition to the polyolefin porous film and the insulating porous layer which are described above, a publicly known porous film(s) (porous layer(s)) such as a heat-resistant layer, an adhesive layer, and a protective layer according to need as long as such a porous film does not prevent an object of an embodiment of the present invention from being attained.

The laminated body in accordance with an embodiment of the present invention includes, as a base material, a nonaqueous electrolyte secondary battery separator having the displacement ratio in a specific range. Therefore, it is possible to increase a capacity maintenance ratio in a case where a nonaqueous electrolyte secondary battery including the laminated body as a nonaqueous electrolyte secondary battery laminated separator is repeatedly subjected to a charge-discharge cycle. This accordingly makes it possible to enhance a cycle characteristic of the nonaqueous electrolyte secondary battery.

[Method for Producing Porous Layer and Method for Producing Laminated Body]

The insulating porous layer in accordance with an embodiment of the present invention and the laminated body in accordance with an embodiment of the present invention can be each produced by, for example, applying a coating solution (described later) to a surface of the polyolefin porous film of the nonaqueous electrolyte secondary battery separator in accordance with an embodiment of the present invention and then drying the coating solution so as to deposit the insulating porous layer.

Prior to applying the coating solution to a surface of the polyolefin porous film of the nonaqueous electrolyte secondary battery separator in accordance with an embodiment of the present invention, the surface to which the coating solution is to be applied can be subjected to a hydrophilization treatment as needed.

The coating solution for use in a method for producing the porous layer in accordance with an embodiment of the present invention and a method for producing the laminated body in accordance with an embodiment of the present invention can be prepared typically by (i) dissolving, in a solvent, a resin that may be contained in the porous layer described above and (ii) dispersing, in the solvent, fine particles that may be contained in the porous layer described above. The solvent in which the resin is to be dissolved here also serves as a dispersion medium in which the fine particles are to be dispersed. Depending on the solvent, the resin may be an emulsion.

The solvent (dispersion medium) is not limited to any particular one, provided that (i) the solvent does not have an adverse effect on the polyolefin porous film, (ii) the solvent allows the resin to be uniformly and stably dissolved in the solvent, and (iii) the solvent allows the fine particles to be uniformly and stably dispersed in the solvent. Specific examples of the solvent (dispersion medium) encompass water and organic solvents. Only one of these solvents can be used, or two or more of these solvents can be used in combination.

The coating solution may be formed by any method, provided that the coating solution can meet conditions, such as a resin solid content (resin concentration) and a fine particle amount, which are necessary for obtaining a desired porous layer. Specific examples of the method of forming the coating solution encompass a mechanical stirring method, an ultrasonic dispersion method, a high-pressure dispersion method, and a media dispersion method. Further, the coating solution may contain, as a component(s) other than the resin and the fine particles, an additive(s) such as a disperser, a plasticizer, a surfactant, and/or a pH adjustor, provided that the additive does not prevent the object of an embodiment of the present invention from being attained. Note that the additive may be contained in an amount that does not prevent the object of an embodiment of the present invention from being attained.

A method of applying the coating solution to the porous film, that is, a method of forming a porous layer on a surface of the polyolefin porous film is not limited to any particular one. The porous layer can be formed by, for example, (i) a method including the steps of applying the coating solution directly to a surface of the polyolefin porous film and then removing the solvent (dispersion medium), (ii) a method including the steps of applying the coating solution to an appropriate support, removing the solvent (dispersion medium) for formation of a porous layer, then pressure-bonding the porous layer to the polyolefin porous film, and subsequently peeling the support off, and (iii) a method including the steps of applying the coating solution to a surface of an appropriate support, then pressure-bonding the polyolefin porous film to that surface, then peeling the support off, and subsequently removing the solvent (dispersion medium).

The coating solution can be applied by a conventionally publicly known method. Specific examples of such a method include a gravure coater method, a dip coater method, a bar coater method, and a die coater method.

The solvent (dispersion medium) is generally removed by a drying method. The solvent (dispersion medium) contained in the coating solution may be replaced with another solvent before a drying operation.

Embodiment 3: Nonaqueous Electrolyte Secondary Battery Member, and Embodiment 4: Nonaqueous Electrolyte Secondary Battery A nonaqueous electrolyte secondary battery member in accordance with Embodiment 3 of the present invention is obtained by including a positive electrode, a nonaqueous electrolyte secondary battery separator in accordance with Embodiment 1 of the present invention or a nonaqueous electrolyte secondary battery laminated separator in accordance with Embodiment 2 of the present invention, and a negative electrode, the positive electrode, the nonaqueous electrolyte secondary battery separator or the nonaqueous electrolyte secondary battery laminated separator, and the negative electrode being disposed in this order.

A nonaqueous electrolyte secondary battery in accordance with Embodiment 4 of the present invention includes the nonaqueous electrolyte secondary battery separator in accordance with Embodiment 1 of the present invention or the nonaqueous electrolyte secondary battery laminated separator in accordance with Embodiment 2 of the present invention.

A nonaqueous electrolyte secondary battery in accordance with an embodiment of the present invention can be, for example, a nonaqueous secondary battery that achieves an electromotive force through doping with and dedoping of lithium, and can include a nonaqueous electrolyte secondary battery member including a positive electrode, a nonaqueous electrolyte secondary battery separator in accordance with an embodiment of the present invention, and a negative electrode, the positive electrode, the nonaqueous electrolyte secondary battery separator, and the negative electrode being disposed in this order. Alternatively, the nonaqueous electrolyte secondary battery in accordance with an embodiment of the present invention can be, for example, a nonaqueous secondary battery that achieves an electromotive force through doping with and dedoping of lithium, and can be a lithium-ion secondary battery that includes a nonaqueous electrolyte secondary battery member including a positive electrode, a porous layer, a nonaqueous electrolyte secondary battery separator in accordance with an embodiment of the present invention, and a negative electrode which are disposed in this order, that is, a lithium-ion secondary battery that includes a nonaqueous electrolyte secondary battery member including a positive electrode, a nonaqueous electrolyte secondary battery laminated separator in accordance with an embodiment of the present invention, and a negative electrode which are disposed in this order. Note that constituent elements, other than the nonaqueous electrolyte secondary battery separator, of the nonaqueous electrolyte secondary battery are not limited to those described below.

The nonaqueous electrolyte secondary battery in accordance with an embodiment of the present invention is typically arranged so that a battery element is enclosed in an exterior member, the battery element including (i) a structure in which the negative electrode and the positive electrode faces each other via the nonaqueous electrolyte secondary battery separator in accordance with an embodiment of the present invention or the nonaqueous electrolyte secondary battery laminated separator in accordance with an embodiment of the present invention and (ii) an electrolyte with which the structure is impregnated. The nonaqueous electrolyte secondary battery is preferably a secondary battery including a nonaqueous electrolyte, and is particularly preferably a lithium-ion secondary battery. Note that the doping means occlusion, support, adsorption, or insertion, and means a phenomenon in which lithium ions enter an active material of an electrode (e.g., a positive electrode).

Since the nonaqueous electrolyte secondary battery member in accordance with an embodiment of the present invention includes the nonaqueous electrolyte secondary battery separator in accordance with an embodiment of the present invention or the nonaqueous electrolyte secondary battery laminated separator in accordance with an embodiment of the present invention, it is possible to increase a capacity maintenance ratio in a case where the nonaqueous electrolyte secondary battery separator member is included in a nonaqueous electrolyte secondary battery and a charge-discharge cycle of this nonaqueous electrolyte secondary battery is repeated. Since the nonaqueous electrolyte secondary battery in accordance with an embodiment of the present invention includes the nonaqueous electrolyte secondary battery separator in accordance with an embodiment of the present invention whose displacement ratio described above is adjusted to be within a specific range, the nonaqueous electrolyte secondary battery advantageously has an increased capacity maintenance ratio and accordingly an excellent cycle characteristic.

<Positive Electrode>

A positive electrode included in the nonaqueous electrolyte secondary battery member in accordance with an embodiment of the present invention or in the nonaqueous electrolyte secondary battery in accordance with an embodiment of the present invention is not limited to any particular one, provided that the positive electrode is one that is generally used as a positive electrode of a nonaqueous electrolyte secondary battery. Examples of the positive electrode encompass a positive electrode sheet having a structure in which an active material layer containing a positive electrode active material and a binder resin is formed on a current collector. The active material layer may further contain an electrically conductive agent and/or a binding agent.

The positive electrode active material is, for example, a material capable of being doped with and dedoped of lithium ions. Specific examples of such a material encompass a lithium complex oxide containing at least one transition metal such as V, Mn, Fe, Co, or Ni.

Examples of the electrically conductive agent include carbonaceous materials such as natural graphite, artificial graphite, cokes, carbon black, pyrolytic carbons, carbon fiber, and a fired product of an organic polymer compound. It is possible to use only one kind of the above electrically conductive agents or two or more kinds of the above electrically conductive agents in combination.

Examples of the binding agent encompass (i) fluorine-based resins such as polyvinylidene fluoride, (ii) acrylic resin, and (iii) styrene butadiene rubber. Note that the binding agent serves also as a thickener.

Examples of the positive electrode current collector encompass electric conductors such as Al, Ni, and stainless steel. Among these, Al is preferable because Al is easily processed into a thin film and is inexpensive.

Examples of a method for producing the positive electrode sheet encompass: a method in which a positive electrode active material, an electrically conductive agent, and a binding agent are pressure-molded on a positive electrode current collector; and a method in which (i) a positive electrode active agent, an electrically conductive agent, and a binding agent are formed into a paste with the use of a suitable organic solvent, (ii) then, a positive electrode current collector is coated with the paste, and (iii) subsequently, the paste is dried and then pressured so that the paste is firmly fixed to the positive electrode current collector.

<Negative Electrode>

A negative electrode included in the nonaqueous electrolyte secondary battery member in accordance with an embodiment of the present invention or in the nonaqueous electrolyte secondary battery in accordance with an embodiment of the present invention is not limited to any particular one, provided that the negative electrode is one that is generally used as a negative electrode of a nonaqueous electrolyte secondary battery. Examples of the negative electrode encompass a negative electrode sheet having a structure in which an active material layer containing a negative electrode active material and a binder resin is formed on a current collector. The active material layer may further contain an electrically conductive agent.

Examples of the negative electrode active material encompass (i) a material capable of being doped with and dedoped of lithium ions, (ii) lithium metal, and (iii) lithium alloy. Examples of such a material encompass carbonaceous materials such as natural graphite, artificial graphite, cokes, carbon black, and pyrolytic carbon.

Examples of the negative electrode current collector encompass Cu, Ni, and stainless steel. Among these, Cu is more preferable because Cu is not easily alloyed with lithium especially in a lithium-ion secondary battery and is easily processed into a thin film.

Examples of a method for producing the negative electrode sheet encompass: a method in which a negative electrode active material is pressure-molded on a negative electrode current collector; and a method in which (i) a negative electrode active material is formed into a paste with the use of a suitable organic solvent, (ii) then, a negative electrode current collector is coated with the paste, and (iii) subsequently, the paste is dried and then pressured so that the paste is firmly fixed to the negative electrode current collector. The above paste preferably includes the above electrically conductive agent and the binding agent.

<Nonaqueous Electrolyte>

A nonaqueous electrolyte in a nonaqueous electrolyte secondary battery in accordance with an embodiment of the present invention is not limited to any particular one, provided that the nonaqueous electrolyte is one that is generally used for a nonaqueous electrolyte secondary battery. The nonaqueous electrolyte can be one prepared by, for example, dissolving a lithium salt in an organic solvent. Examples of the lithium salt encompass $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. It is possible to use only one kind of the above lithium salts or two or more kinds of the above lithium salts in combination.

Examples of the organic solvent to be contained in the nonaqueous electrolyte encompass carbonates, ethers, esters, nitriles, amides, carbamates, and sulfur-containing compounds, and fluorine-containing organic solvents each obtained by introducing a fluorine group into any of these organic solvents. It is possible to use only one kind of the above organic solvents or two or more kinds of the above organic solvents in combination.

<Method for Producing Nonaqueous Electrolyte Secondary Battery Member and Method for Producing Nonaqueous Electrolyte Secondary Battery>

A nonaqueous electrolyte secondary battery member in accordance with an embodiment of the present invention can be produced by, for example, disposing the positive electrode, the nonaqueous electrolyte secondary battery separator in accordance with an embodiment of the present invention or the nonaqueous electrolyte secondary battery laminated separator in accordance with an embodiment of the present invention, and the negative electrode in this order.

Further, a nonaqueous electrolyte secondary battery in accordance with an embodiment of the present invention can be produced by, for example, (i) forming a nonaqueous electrolyte secondary battery member by the method described above, (ii) placing the nonaqueous electrolyte secondary battery member in a container which is to serve as a housing of the nonaqueous electrolyte secondary battery, (iii) filling the container with a nonaqueous electrolyte, and then (iv) hermetically sealing the container while reducing the pressure inside the container.

EXAMPLES

The following description will discuss embodiments of the present invention in greater detail with reference to Examples and Comparative Example. Note, however, that the present invention is not limited to the following Examples and Comparative Example.

[Measurement Method]

The following method was used for measurement of physical properties and the like of a polyolefin porous film produced in each of Examples 1 to 3 and Comparative Example 1 and measurement of a cycle characteristic of a nonaqueous electrolyte secondary battery produced in each of Examples 1 to 3 and Comparative Example 1.

[Porosity]

The following steps (a) to (d) were used to calculate a porosity of a nonaqueous electrolyte secondary battery separator (polyolefin porous film) produced in each of Examples 1 to 3 and Comparative Example 1.

(a) Measurement of Thickness of Film

A thickness of the porous film was measured with the use of a high-precision digital measuring device (VL-50) manufactured by Mitutoyo Corporation.

(b) Measurement of Weight Per Unit Area

A sample in the form of an 8 cm square was cut out from the porous film, and the weight W(g) of the sample was measured. Then, the weight per unit area of the porous film was calculated in accordance with the following Formula (2):

$$\text{Weight per unit area (g/m}^2\text{)}=W/(0.08 \times 0.08) \qquad (2)$$

(c) Measurement of Real Density

First, the porous film was cut into 4 mm to 6 mm square pieces. Then, after these square pieces were vacuum-dried at a temperature of not higher than 30° C. for 17 hours, a true density of the porous film was measured by a helium gas displacement technique, by using a dry-type automatic densimeter (AccuPye II 1340 manufactured by Micromeritics Instrument Corporation).

(d) Calculation of Porosity

A porosity [%] of the porous film was calculated, by the following Formula (1), from the thickness [μm], the weight per unit area [g/m$^2$] and the real density [g/m$^3$] of the porous film, which were measured and/or calculated in the above steps (a) to (c).

$$\text{(Porosity)}=[1-(\text{weight per unit area})/\{(\text{thickness of film}) \times 10^{-6} \times 1[\text{m}^2] \times (\text{real density})\}] \times 100 \qquad (1)$$

[Compression Characteristic]

A dynamic ultra micro hardness tester (Shimadzu Corporation: DUH-211S) was used to measure a compression characteristic (the displacement amount at the 10th loading-unloading cycle and the displacement amount at the 50th loading-unloading cycle: displacement ratio) of the nonaqueous electrolyte secondary battery separator (polyolefin porous film) produced in each of Examples 1 to 3 and Comparative Example 1. This measurement was carried out by using a loading-unloading test mode with a set push-in depth, under the following conditions.

As illustrated in FIG. 1, a 1 cm square piece was cut out from the nonaqueous electrolyte secondary battery separator produced in each of Examples 1 to 3 and Comparative Example 1, so that a measurement sample 2 was obtained. Then, the measurement sample 2 was fixed onto a sample stage with an adhesive (water-based glue) (manufactured by Yamato Co. Ltd., product name: Arabic Yamato). Then, a flat indenter 1 (made of diamond) having a diameter of 50 μm was pushed into the measurement sample 2 at a speed of 0.4877 mN/sec from a surface of the measurement sample 2 until the flat indenter 1 reached a depth at which an applied load reached 1 mN. Immediately after this loading and without a hold time, the flat indenter 1 was retracted at a speed of 0.4877 mN/sec to the position of the surface of the measurement sample 2, at which position the applied load was 0 mN. The term "applied load" here means the magnitude of stress that is applied to the flat indenter 1 by the measurement sample 2 in a case where the flat indenter 1 is pushed into the measurement sample 2.

A cycle in which a load was applied to the measurement sample 2 and then immediately removed from the measurement sample 2 (loading-unloading cycle) was repeated 50 times. At the 10th loading-unloading cycle, the measurement sample 2 was subjected to measurement of a distance between (i) a depth at which the flat indenter 1 pushed had reached in the measurement sample 2 and (ii) a position of the surface of the measurement sample 2 at which position an applied load to the flat indenter 1 retracted was 0 mN. This distance was defined as a displacement amount (unit: μm) at the 10th loading-unloading cycle. Similarly, at the 50th loading-unloading cycle, the measurement sample 2 was subjected to measurement of a distance between (i) a depth at which the flat indenter 1 pushed had reached in the measurement sample 2 and (ii) a position of the surface of the measurement sample 2 at which position an applied load to the flat indenter 1 retracted was 0 mN. This distance was defined as a displacement amount (unit: μm) at the 50th loading-unloading cycle.

The term "surface" here means a position at which an applied load is 0 mN in a loading-unloading cycle.

The displacement ratio: {(the displacement amount at the 10th loading-unloading cycle)/(displacement amount at the 50th loading-unloading cycle)} was calculated from the displacement amount at the 10th loading-unloading cycle and the displacement amount at the 50th loading-unloading cycle, which were measured by the method described above.

[Cycle Characteristic: Capacity Maintenance Ratio]

The following method was used for measuring a capacity maintenance ratio of the nonaqueous electrolyte secondary battery after 100 cycles, which nonaqueous electrolyte secondary battery was produced in each of Examples 1 to 3 and Comparative Example 1, and for evaluating a cycle characteristic of the nonaqueous electrolyte secondary battery.

The nonaqueous electrolyte secondary battery (produced in each of Examples 1 to 3 and Comparative Example 1) which had not been subjected to any charge-discharge cycle was subjected to four cycles of initial charge and discharge. Each of the four cycles of the initial charge and discharge was carried out at 25° C., at a voltage ranging from 4.1 V to 2.7 V, and at an electric current value of 0.2 C (note that 1 C is an electric current value at which a battery rated capacity derived from a one-hour rate discharge capacity is discharged in one hour, and this applies to the following descriptions).

Then, a capacity (initial capacity) of the nonaqueous electrolyte secondary battery having been subjected to the initial charge and discharge was measured.

Next, the nonaqueous electrolyte secondary battery after measurement of the initial capacity was subjected to 100 cycles of charge and discharge. In each of the 100 cycles of charge and discharge, the charge and discharge were carried out at 55° C., and at a constant electric current of a charge electric current value of 1 C and a discharge electric current value of 10 C. Then, a capacity (capacity after 100 cycles) of the nonaqueous electrolyte secondary battery having been subjected to the 100 cycles of charge and discharge was measured.

Subsequently, a ratio of the capacity after 100 cycles to the initial capacity, which had been measured as described above, was calculated. This ratio was defined as a capacity maintenance ratio after 100 cycles.

Example 1

First, 18% by weight of ultra-high molecular weight polyethylene powder (HI-ZEX MILLION 145M, manufactured by Mitsui Chemicals, Inc.) and 2% by weight of alicyclic saturated hydrocarbon resin having a softening point of 90.5° C. (measured by a ball and ring method) were prepared. These powders were pulverized and mixed by a blender. Here, pulverization was carried out until particles of the powders had the same particle diameter. Then, a resultant mixed powder was fed to a twin screw kneading extruder by a quantitative feeder, and melt-kneaded in the twin screw kneading extruder. When the mixed powder was melt-kneaded, 80% by weight of liquid paraffin was added under pressure into the twin screw kneading extruder via a pump, and melt-kneaded together with the mixed powder.

Thereafter, a melt-kneaded material thus obtained was extruded through a T-die via a gear pump, so that a polyolefin resin composition was prepared. The polyolefin resin composition was cooled by a cooling roller, and as a result, a roll of sheet-shaped polyolefin resin composition was obtained.

The sheet-shaped polyolefin resin composition thus obtained was fed into a stretching apparatus at a feed speed of 2 m/min, conveyed at an intermediate speed of 12.8 m/min, and discharged at a discharge speed of 8 m/min. As a result, the sheet-shaped polyolefin resin composition was stretched at a stretch ratio of 4.0 times in the MD. This stretching was carried out at a stretch temperature of 117° C., at a stretch ratio of 6.4 times at the intermediate speed, and at a stretching speed ratio of 0.38. The above stretching was followed by stretching in the TD at a stretch temperature of 115° C. and at a stretch ratio of 6.0 times.

The sheet-shaped polyolefin resin composition thus stretched was immersed in heptane and cleaned. Thereafter, the sheet-shaped polyolefin resin composition was dried at room temperature. After this drying, the sheet-shaped polyolefin resin composition was subjected to heat fixing in an oven at 125° C. for 5 minutes, so that a polyolefin porous film having a thickness of 14.4 µm and a porosity of 50% was obtained. The polyolefin porous film was defined as the polyolefin porous film 1.

Example 2

First, 18% by weight of ultra-high molecular weight polyethylene powder (HI-ZEX MILLION 145M, manufactured by Mitsui Chemicals, Inc.) and 2% by weight of alicyclic saturated hydrocarbon resin having a softening point of 112.0° C. (measured by a ball and ring method) were prepared. These powders were pulverized and mixed by a blender. Here, pulverization was carried out until particles of the powders had the same particle diameter. Then, a resultant mixed powder was fed to a twin screw kneading extruder by a quantitative feeder, and melt-kneaded in the twin screw kneading extruder. When the mixed powder was melt-kneaded, 80% by weight of liquid paraffin was added under pressure into the twin screw kneading extruder via a pump, and melt-kneaded together with the mixed powder.

Thereafter, a melt-kneaded material thus obtained was extruded through a T-die via a gear pump, so that a polyolefin resin composition was prepared. The polyolefin resin composition was cooled by a cooling roller, and as a result, a roll of sheet-shaped polyolefin resin composition was obtained.

The sheet-shaped polyolefin resin composition thus obtained was fed into a stretching apparatus at a feed speed of 2 m/min, conveyed at an intermediate speed of 12.8 m/min, and discharged at a discharge speed of 8 m/min. As a result, the sheet-shaped polyolefin resin composition was stretched at a stretch ratio of 4.0 times in the MD. This stretching was carried out at a stretch temperature of 117° C., at a stretch ratio of 6.4 times at the intermediate speed, and at a stretching speed ratio of 0.38. The above stretching was followed by stretching in the TD at a stretch temperature of 115° C. and at a stretch ratio of 6.0 times.

The sheet-shaped polyolefin resin composition thus stretched was immersed in heptane and cleaned. Thereafter, the sheet-shaped polyolefin resin composition was dried at room temperature. After this drying, the sheet-shaped polyolefin resin composition was subjected to heat fixing in an oven at 130° C. for 15 minutes, so that a polyolefin porous film having a thickness of 12.2 µm and a porosity of 30% was obtained. The polyolefin porous film was defined as the polyolefin porous film 2.

Example 3

First, 18% by weight of ultra-high molecular weight polyethylene powder (HI-ZEX MILLION 145M, manufactured by Mitsui Chemicals, Inc.) and 2% by weight of alicyclic saturated hydrocarbon resin having a softening point of 124.5° C. (measured by a ball and ring method) were prepared. These powders were pulverized and mixed by a blender. Here, pulverization was carried out until particles of the powders had the same particle diameter. Then, a resultant mixed powder was fed to a twin screw kneading extruder by a quantitative feeder, and melt-kneaded in the twin screw kneading extruder. When the mixed powder was melt-kneaded, 80% by weight of liquid paraffin was added under pressure into the twin screw kneading extruder via a pump, and melt-kneaded together with the mixed powder.

Thereafter, a melt-kneaded material thus obtained was extruded through a T-die via a gear pump, so that a polyolefin resin composition was prepared. The polyolefin resin composition was cooled by a cooling roller, and as a result, a roll of sheet-shaped polyolefin resin composition was obtained.

The sheet-shaped polyolefin resin composition thus obtained was fed into a stretching apparatus at a feed speed of 2 m/min, conveyed at an intermediate speed of 12.8 m/min, and discharged at a discharge speed of 8 m/min. As a result, the sheet-shaped polyolefin resin composition was stretched at a stretch ratio of 4.0 times in the MD. This stretching was carried out at a stretch temperature of 117° C., at a stretch ratio of 6.4 times at the intermediate speed, and at a stretching speed ratio of 0.38. The above stretching was followed by stretching in the TD at a stretch temperature of 115° C. and at a stretch ratio of 6.0 times.

The sheet-shaped polyolefin resin composition thus stretched was immersed in heptane and cleaned. Thereafter, the sheet-shaped polyolefin resin composition was dried at room temperature. After this drying, the sheet-shaped polyolefin resin composition was subjected to heat fixing in an oven at 128° C. for 10 minutes, so that a polyolefin porous film having a thickness of 15.0 µm and a porosity of 50% was obtained. The polyolefin porous film was defined as the polyolefin porous film 3.

Comparative Example 1

First, 20% by weight of ultra-high molecular weight polyethylene powder (HI-ZEX MILLION 145M, manufactured by Mitsui Chemicals, Inc.) was prepared. This powder was fed to a twin screw kneading extruder by a quantitative feeder, and 80% by weight of liquid paraffin was added under pressure into the twin screw kneading extruder via a pump. Then, the powder and the liquid paraffin were melt-kneaded in the twin screw kneading extruder.

Thereafter, a melt-kneaded material thus obtained was extruded through a T-die via a gear pump, so that a polyolefin resin composition was prepared. The polyolefin resin composition was cooled by a cooling roller, and as a result, a roll of sheet-shaped polyolefin resin composition was obtained.

The sheet-shaped polyolefin resin composition thus obtained was fed into a stretching apparatus at a feed speed of 2 m/min, conveyed at an intermediate speed of 12.8 m/min, and discharged at a discharge speed of 8 m/min. As a result, the sheet-shaped polyolefin resin composition was stretched at a stretch ratio of 4.0 times in the MD. This stretching was carried out at a stretch temperature of 117° C., at a stretch ratio of 6.4 times at the intermediate speed, and at a stretching speed ratio of 0.38. The above stretching was followed by stretching in the TD at a stretch temperature of 115° C. and at a stretch ratio of 6.0 times.

The sheet-shaped polyolefin resin composition thus stretched was immersed in heptane and cleaned. Thereafter, the sheet-shaped polyolefin resin composition was dried at room temperature. After this drying, the sheet-shaped polyolefin resin composition was subjected to heat fixing in an oven at 133° C. for 20 minutes, so that a polyolefin porous film having a thickness of 15.4 µm and a porosity of 40% was obtained. The polyolefin porous film was defined as the polyolefin porous film 4.

[Preparation of Nonaqueous Electrolyte Secondary Battery]

The following method was used for preparing a nonaqueous electrolyte secondary battery by using each of the polyolefin porous films 1 to 4 produced in Examples 1 to 3 and Comparative Example 1, respectively.

(Preparation of positive electrode) A commercially available positive electrode was used that was produced by applying $LiNi_{0.5}Mn_{0.3}Co_{0.2}O_2$/electrically conductive agent/PVDF (weight ratio 92:5:3) to an aluminum foil. The aluminum foil of the commercially available positive electrode was partially cut off so that a positive electrode active material layer was present in an area of 45 mm×30 mm and that this area with the positive electrode active material layer was surrounded by an area with a width of 13 mm in which area no positive electrode active material layer was present. A portion thus cut from the commercially available positive electrode was used as a positive electrode. The positive electrode active material layer had a thickness of 58 μm and a density of 2.50 g/cm$^3$. The positive electrode had a capacity of 174 mAh/g.

(Preparation of Negative Electrode)

A commercially available negative electrode was used that was produced by applying graphite/styrene-1,3-butadiene copolymer/sodium carboxymethylcellulose (weight ratio 98:1:1) to a copper foil. The copper foil of the commercially available negative electrode was partially cut off so that a negative electrode active material layer was present in an area of 50 mm×35 mm and that this area with the negative electrode active material layer was surrounded by an area with a width of 13 mm in which area no negative electrode active material layer was present. A portion thus cut from the commercially available negative electrode was used as a negative electrode. The negative electrode active material layer had a thickness of 49 μm and a density of 1.40 g/cm$^3$. The negative electrode had a capacity of 372 mAh/g.

(Assembly of Nonaqueous Electrolyte Secondary Battery)

In a laminate pouch, the positive electrode, the polyolefin porous film as the nonaqueous electrolyte secondary battery separator, and the negative electrode were disposed (arranged to form a laminate) in this order so as to obtain a nonaqueous electrolyte secondary battery member. During this operation, the positive electrode and the negative electrode were arranged so that the positive electrode active material layer of the positive electrode had a main surface that was entirely covered by the main surface of the negative electrode active material layer of the negative electrode.

Subsequently, the nonaqueous electrolyte secondary battery member was put into a bag made of a laminate of an aluminum layer and a heat seal layer. Further, 0.25 mL of nonaqueous electrolyte was put into the bag. The nonaqueous electrolyte was an electrolyte at 25° C. prepared by dissolving $LiPF_6$ in a mixed solvent of ethyl methyl carbonate, diethyl carbonate, and ethylene carbonate in a volume ratio of 50:20:30 so that the concentration of $LiPF_6$ in the electrolyte was 1.0 mole per liter. The bag was then heat-sealed while the pressure inside the bag was reduced. This produced a nonaqueous electrolyte secondary battery. The nonaqueous electrolyte secondary battery had a design capacity of 20.5 mAh. Note, here, that nonaqueous electrolyte secondary batteries each produced by using a corresponding one of the polyolefin porous films 1 to 4 as the polyolefin porous film are defined as nonaqueous electrolyte secondary batteries 1 to 4, respectively.

[Results]

Table 1 below shows the "porosity", the "displacement amount at the 10th loading-unloading cycle", the "displacement amount at the 50th loading-unloading cycle", and the "displacement ratio" of each of the polyolefin porous films 1 to 4 produced in Examples 1 to 3 and Comparative Example 1, respectively, and the "capacity maintenance ratio after 100 charge-discharge cycles" of each of the nonaqueous electrolyte secondary batteries 1 to 4 including the polyolefin porous films 1 to 4 produced in Examples 1 to 3 and Comparative Example 1, respectively.

TABLE 1

| | POROSITY [%] | DISPLACEMENT AMOUNT AT 10TH LOADING-UNLOADING CYCLE [μm] | DISPLACEMENT AMOUNT AT 50TH LOADING-UNLOADING CYCLE [μm] | DISPLACEMENT RATIO [%] | CAPACITY MAINTENANCE RATIO AFTER 100 CYCLES [%] |
|---|---|---|---|---|---|
| EXAMPLE 1 | 50 | 0.132 | 0.111 | 119 | 83 |
| EXAMPLE 2 | 30 | 0.083 | 0.064 | 130 | 75 |
| EXAMPLE 3 | 50 | 0.113 | 0.105 | 108 | 73 |
| COMPARATIVE EXAMPLE 1 | 40 | 0.081 | 0.061 | 133 | 60 |

CONCLUSION

It was found that the nonaqueous electrolyte secondary battery including the nonaqueous electrolyte secondary battery separator (polyolefin porous film), which was produced in each of Examples 1 to 3 and had a displacement ratio in a range of 100% to 130%, had a higher capacity maintenance ratio after 100 charge-discharge cycles, as compared to the nonaqueous electrolyte secondary battery including the nonaqueous electrolyte secondary battery separator, which was produced in Comparative Example 1 and had a displacement ratio outside the above range, and accordingly, the nonaqueous electrolyte secondary battery including the nonaqueous electrolyte secondary battery separator produced in each of Examples 1 to 3 was superior in cycle characteristic to the nonaqueous electrolyte secondary battery including the nonaqueous electrolyte secondary battery separator produced in Comparative Example 1.

INDUSTRIAL APPLICABILITY

A nonaqueous electrolyte secondary battery separator in accordance with an embodiment of the present invention is excellent in cycle characteristic. Therefore, the nonaqueous electrolyte secondary battery separator in accordance with an embodiment of the present invention is useful as a member for a nonaqueous electrolyte secondary battery.

REFERENCE SIGNS LIST 1 flat indenter
2 measurement sample

The invention claimed is:

1. A method for producing a nonaqueous electrolyte secondary battery separator containing a polyolefin porous film, comprising the steps of:

(A) melt-kneading a polyolefin-based resin powder and an additive in a kneader to obtain a polyolefin resin composition;

(B) extruding the polyolefin resin composition through a T-die of an extruder, and then shaping the polyolefin resin composition into a sheet while cooling the polyolefin resin composition, so that a sheet-shaped polyolefin resin composition is obtained;

(C) stretching the sheet-shaped polyolefin resin composition, so that a feed speed, an intermediate speed, and a discharge speed of the sheet-shaped polyolefin resin composition in a stretching apparatus meet a relation of feed speed<discharge speed<intermediate speed, and the sheet-shaped polyolefin resin composition has a stretching speed ratio of 0.1 to 0.7, the stretching speed ratio being defined by an equation below;

stretching speed ratio={(intermediate speed)−(discharge speed)}/(intermediate speed)

(D) cleaning, with use of a cleaning liquid, the polyolefin resin composition having been stretched in the step (C); and (E) drying and/or heat fixing the polyolefin resin composition having been cleaned in the step (D), so that a polyolefin porous film is obtained.

2. The method as set forth in claim 1, wherein in the step (A), the additive is a combination of an additive (i) that exists in a solid state at 25° C. and an additive (ii) that exists in a liquid state at 25° C.

3. The method as set forth in claim 1, wherein in the step (E), the polyolefin resin composition having been cleaned in the step (D) is heat fixed at a heat fixing temperature of not lower than 110° C. and not higher than 130° C.

4. The method as set forth in claim 1, wherein
the polyolefin porous film contains a high molecular weight component having a weight-average molecular weight of $3\times10^5$ to $15\times10^6$,
the polyolefin porous film has a thickness of 4 µm to 40 µm, and
the polyolefin porous film has a porosity of 20% by volume to 80% by volume.

5. A method for producing a nonaqueous electrolyte secondary battery laminated separator comprising a non-aqueous electrolyte secondary battery separator and an insulating porous layer,
said method comprising the steps of:
producing a nonaqueous electrolyte secondary battery separator by the method set forth in claim 1; and
providing an insulating porous layer on one surface or both surfaces of the nonaqueous electrolyte secondary battery separator.

6. A method for producing a nonaqueous electrolyte secondary battery member comprising: a positive electrode; a nonaqueous electrolyte secondary battery separator; and a negative electrode, the positive electrode, the nonaqueous electrolyte secondary battery separator, and the negative electrode being disposed in this order,
said method comprising the steps of:
producing a nonaqueous electrolyte secondary battery separator by the method set forth in claim 1; and
disposing the positive electrode, the nonaqueous electrolyte secondary battery separator, and the negative electrode in this order.

7. A method for producing a nonaqueous electrolyte secondary battery comprising a nonaqueous electrolyte secondary battery separator,
said method comprising the steps of:
producing a nonaqueous electrolyte secondary battery separator by the method set forth in claim 1;
disposing a positive electrode, the nonaqueous electrolyte secondary battery separator, and a negative electrode in this order to produce a nonaqueous electrolyte secondary battery member; and
placing the nonaqueous electrolyte secondary battery member in a container to serve as a housing of the nonaqueous electrolyte secondary battery, filling the container with a nonaqueous electrolyte, and then hermetically sealing the container while reducing a pressure inside the container.

8. A method for producing a nonaqueous electrolyte secondary battery member comprising: a positive electrode; a nonaqueous electrolyte secondary battery laminated separator; and a negative electrode, the positive electrode, the nonaqueous electrolyte secondary battery laminated separator, and the negative electrode being disposed in this order,
said method comprising the steps of:
producing a nonaqueous electrolyte secondary battery laminated separator by the method set forth in claim 5; and
disposing the positive electrode, the nonaqueous electrolyte secondary battery laminated separator, and the negative electrode in this order.

9. A method for producing a nonaqueous electrolyte secondary battery comprising a nonaqueous electrolyte secondary battery laminated separator,
said method comprising the steps of:
producing a nonaqueous electrolyte secondary battery laminated separator by the method set forth in claim 5;
disposing a positive electrode, the nonaqueous electrolyte secondary battery laminated separator, and a negative electrode in this order to produce a nonaqueous electrolyte secondary battery member; and
placing the nonaqueous electrolyte secondary battery member in a container to serve as a housing of the nonaqueous electrolyte secondary battery, filling the container with a nonaqueous electrolyte, and then hermetically sealing the container while reducing a pressure inside the container.

10. The method as set forth in claim 5, wherein the insulating porous layer contains a polyamide-based resin.

* * * * *